United States Patent
Fujishiro et al.

(10) Patent No.: US 10,348,461 B2
(45) Date of Patent: Jul. 9, 2019

(54) COMMUNICATION APPARATUS AND COMMUNICATION METHOD

(71) Applicant: KYOCERA CORPORATION, Kyoto (JP)

(72) Inventors: Masato Fujishiro, Yokohama (JP); Chiharu Yamazaki, Tokyo (JP); Hiroyuki Urabayashi, Yokohama (JP); Kugo Morita, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 103 days.

(21) Appl. No.: 15/558,212

(22) PCT Filed: Mar. 17, 2016

(86) PCT No.: PCT/JP2016/058434
§ 371 (c)(1),
(2) Date: Sep. 14, 2017

(87) PCT Pub. No.: WO2016/148221
PCT Pub. Date: Sep. 22, 2016

(65) Prior Publication Data
US 2018/0076936 A1    Mar. 15, 2018

(30) Foreign Application Priority Data

Mar. 17, 2015  (JP) .................................. 2015-054049

(51) Int. Cl.
*H04L 5/00* (2006.01)
*H04W 16/14* (2009.01)
*H04W 72/04* (2009.01)

(52) U.S. Cl.
CPC .............. *H04L 5/001* (2013.01); *H04W 16/14* (2013.01); *H04W 72/0453* (2013.01)

(58) Field of Classification Search
CPC .... H04L 5/001; H04W 16/14; H04W 72/0453
See application file for complete search history.

(56) References Cited

U.S. PATENT DOCUMENTS

| | | | |
|---|---|---|---|
| 2014/0036818 A1* | 2/2014 | Koskela | H04W 72/1231 370/329 |
| 2014/0044105 A1* | 2/2014 | Bontu | H04L 5/001 370/336 |

(Continued)

OTHER PUBLICATIONS

International Search Report issued in PCT/JP2016/058434; dated Jun. 7, 2016.

(Continued)

*Primary Examiner* — Ajay Cattungal
(74) *Attorney, Agent, or Firm* — Studebaker & Brackett PC

(57) ABSTRACT

A communication apparatus comprises: a first processing unit configured to perform processing of a first layer; and a second processing unit configured to perform processing of a second layer which is provided to be upper than the first layer. The second processing unit is configured to perform communication by using a first component carrier included in a licensed band and perform communication by using a second component carrier included in an unlicensed band. The first processing unit is configured to perform communication by using the first component carrier and performs communication by using an element carrier selected from among a plurality of element carriers associated with the second component carrier.

14 Claims, 13 Drawing Sheets

(56) References Cited

U.S. PATENT DOCUMENTS

| | | | | |
|---|---|---|---|---|
| 2015/0056931 A1* | 2/2015 | Yerramalli | ............ | H04B 17/00 |
| | | | | 455/67.13 |
| 2015/0071220 A1* | 3/2015 | Luo | ........................ | H04L 5/001 |
| | | | | 370/329 |
| 2015/0156636 A1* | 6/2015 | Tabet | .................... | H04W 16/14 |
| | | | | 370/329 |
| 2015/0156638 A1* | 6/2015 | Yerramalli | ............ | H04W 16/14 |
| | | | | 455/454 |
| 2015/0181589 A1* | 6/2015 | Luo | ..................... | H04B 7/0452 |
| | | | | 370/329 |
| 2016/0119951 A1* | 4/2016 | Mallik | .................... | H04L 5/001 |
| | | | | 370/329 |
| 2016/0183097 A1* | 6/2016 | Richards | ................. | H04L 5/001 |
| | | | | 455/454 |
| 2016/0227578 A1* | 8/2016 | Lee | ...................... | H04W 74/004 |
| 2016/0302183 A1* | 10/2016 | Yang | ..................... | H04L 5/1415 |
| 2017/0201902 A1* | 7/2017 | Chen | ................. | H04W 28/0215 |
| 2017/0303220 A1* | 10/2017 | Sadeghi | ................ | H04L 5/0053 |
| 2017/0311322 A1* | 10/2017 | Kim | ...................... | H04W 72/04 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.1.0; Mar. 2014; pp. 1-209; Release 12; 3GPP Organizational Partners.

HTC; Dynamic Carrier Selection between LAA CCs; 3GPP TSG-RAN WG1 Meeting #83; R1-157280; Nov. 15-22, 2015; pp. 1-4; Anaheim, U.S.A.

* cited by examiner

FIG. 17

```
RadioResourceConfigDedicatedSCell-r13 ::= SEQUENCE {
    EC-ToAddModList ::= SEQUENCE (SIZE (maxCC) OF EC-ToAddMod
    EC-ToAddMod ::= SEQUENCE {
        CC-Identity              INTEGER (1..x),
        EC-ConfigList    ::=     SEQUENCE (SIZE (maxEC)) OF EC-Configuration
    }
    EC-Configuration       ::= SEQUENCE {
        EC-Identity              INTEGER (1..1),
        physCellId               PhysCellId,
        dl-CarrierFreq           ARFCN-ValueEUTRA
        dl-Bandwidth           ENUMERATED {n6, n15, n25, n50, n75, n100} Optional,
    }
}
```

COMMUNICATION APPARATUS AND COMMUNICATION METHOD

TECHNICAL FIELD

The present invention relates to a communication apparatus and a communication method to perform communication by using component carriers included in a licensed band and an unlicensed band.

BACKGROUND ART

In 3GPP (3rd Generation Partnership Project), which is a project aiming to standardize a mobile communication system, it is discussed to utilize a new frequency band in order to cope with a rapid increase of a traffic demand (for example, see Non-Patent Literature 1).

Here, as the new frequency bandwidth, it is considered to utilize a specific frequency bandwidth including a plurality of component carriers having a predetermined bandwidth in such a manner that utilization of a plurality of telecommunications carriers or a plurality of communication systems is permitted.

As the specific frequency band, for example, a band used in Wi-Fi, Bluetooth (registered trademark) or the like, that is, an unlicensed band which does not require license is considered. In the 3PGG, a technique utilizing the unlicensed band in an LTE system (LAA: Licensed Assisted Access) is discussed.

PRIOR ART DOCUMENT

Non-Patent Literature

Non-Patent Literature 1: 3GPP Technical Report "TS36.300 V12.1.0", March, 2014.

SUMMARY

A communication apparatus according to one embodiment comprises: a first processing unit configured to perform processing of a first layer; and a second processing unit configured to perform processing of a second layer which is provided to be upper than the first layer. The second processing unit is configured to perform communication by using a first component carrier included in a licensed band and perform communication by using a second component carrier included in an unlicensed band. The first processing unit is configured to perform communication by using the first component carrier and performs communication by using an element carrier selected from among a plurality of element carriers associated with the second component carrier.

A communication method according to one embodiment comprises: a step A of performing processing of a first layer and; and a step B of performing processing of a second layer that is provided to be upper than the first layer. The step B includes the step of performing communication by using a first component carrier included in a licensed band and performing communication by using a second component carrier included in an unlicensed band. The step A includes the step of performing communication by using the first component carrier and performing communication by using an element carrier selected from among a plurality of element carriers associated with the second component carrier.

BRIEF DESCRIPTION OF THE DRAWINGS

FIG. 17 is a diagram showing an example of a message format of RRC Connection Reconfiguration.

DESCRIPTION OF THE EMBODIMENT

Figure 1:
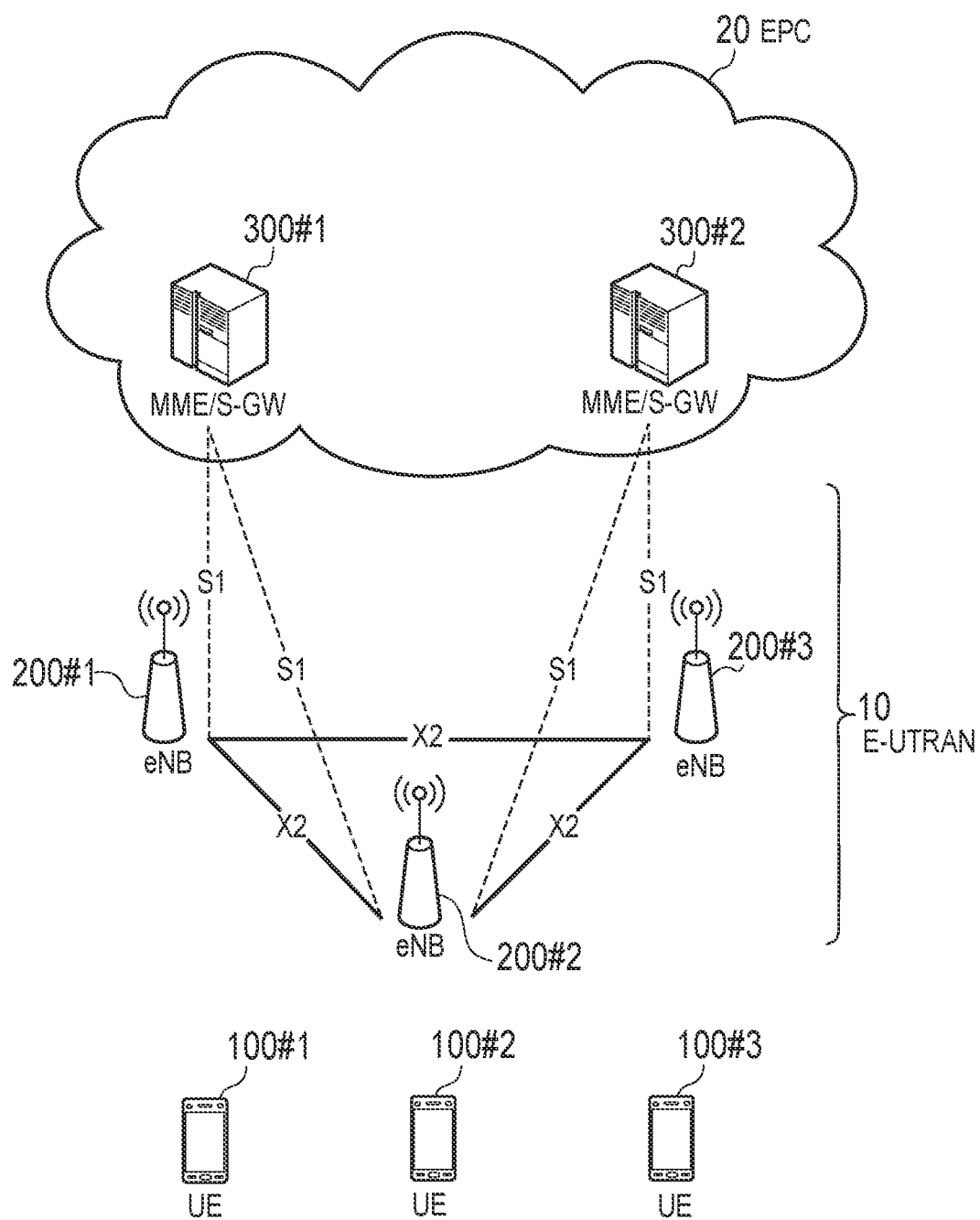
FIG. 1 is a configuration diagram of an LTE system according to an embodiment.

Hereinafter, the embodiment will be described with reference to the drawings. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

[Overview of Disclosure]

A case is assumed in which it is preferable to switch a component carrier (CC) used in an unlicensed band in order to avoid interference of a communication system such as Wi-Fi, Bluetooth (registered trademark) or the like. However, in the existing specification in the project for standardization mentioned above, it is neither permitted nor specified to arbitrarily switch a component carrier (CC) used in the unlicensed band in the MAC layer (for example, HARQ process to perform retransmission control). Therefore, in order to avoid the interference of Wi-Fi, Bluetooth (registered trademark) or the like, there is a need to introduce an appropriate method so as not to violate the existing specification.

Thus, an embodiment provides a communication apparatus and a communication method which are capable of avoiding the interference of Wi-Fi, Bluetooth (registered trademark) or the like so as not to violate the existing specification.

A communication apparatus according to the embodiment comprises: a first processing unit configured to perform processing of a first layer; and a second processing unit configured to perform processing of a second layer which is provided to be upper than the first layer. The second processing unit is configured to perform communication by using a first component carrier included in a licensed band and perform communication by using a second component carrier included in an unlicensed band. The first processing unit is configured to perform communication by using the first component carrier and performs communication by using an element carrier selected from among a plurality of element carriers associated with the second component carrier.

In the embodiment, a first processing unit (for example, PHY layer) which is provided to be lower than a second processing unit (for example, MAC layer) to perform communication by using a second component carrier performs communication by using an element carrier selected from among a plurality of element carriers associated with the second component carrier. That is, by introducing a novel concept referred to as an element carrier used in the first processing unit (for example, PHY layer), it is possible to perform switching of the element carrier in the first processing unit, and the interference of Wi-Fi, Bluetooth (registered trademark) or the like can be avoided.

Embodiment

Hereinafter, an LTE system based on the 3GPP standard will be described as an example of a mobile communication system.

(System Configuration)

A system configuration of the LTE system according to the embodiment will be described below. FIG. 1 is a configuration diagram illustrating the LTE system according to the embodiment.

The LTE system according to the embodiment includes user equipments (UEs) 100, an evolved-UMTS terrestrial radio access network (E-UTRAN) 10, and an evolved packet core (EPC) 20 as illustrated in FIG. 1.

The UE 100 corresponds to a user terminal. The UE 100 is a mobile communication apparatus, and performs radio communication with a cell (a serving cell when the UE 100 is in an RRC connected state) formed by an eNB 200. A configuration of the UE 100 will be described later.

The E-UTRAN 10 corresponds to a radio access network. The E-UTRAN 10 includes evolved Node-Bs (eNBs) 200. The eNB 200 corresponds to a radio base station. The eNBs 200 are connected to one another via an X2 interface. A configuration of the eNB 200 will be described later.

The eNB 200 forms one or more cells, and performs radio communication with the UE 100 that has established a connection with its own cell. The eNB 200 has a radio resource management (RRM) function, a user data routing function, a measurement control function for mobility control/scheduling, and the like. A "cell" is used as not only a term indicating a minimum unit of a radio communication area but also a term indicating a function of performing radio communication with the UE 100.

The EPC 20 corresponds to a core network. The EPC 20 includes a mobility management entity (MME)/serving-gateway (S-GW) 300. The MME performs various kinds of mobility controls on the UE 100. The SGW performs user data transfer control. The MME/S-GW 300 is connected with the eNB 200 via an S1 interface. The E-UTRAN 10 and the EPC 20 constitute a network of the LTE system.

Figure 2:
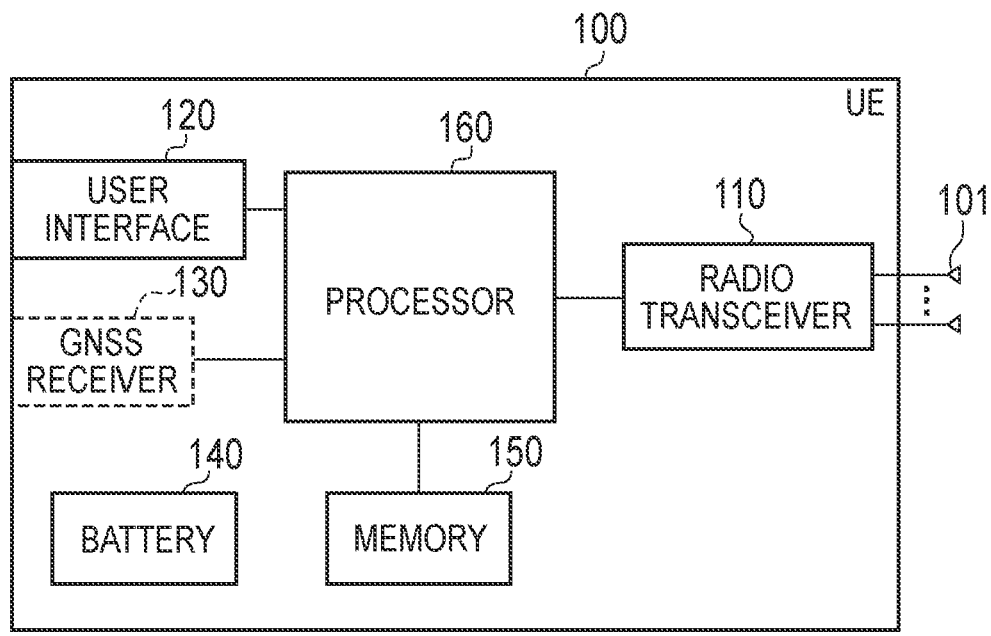
FIG. 2 is a block diagram of an UE 100 according to the embodiment.

FIG. 2 is a block diagram illustrating the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller. The radio transceiver 110 and the processor 160 constitute a transmitting unit and a receiving unit. The UE 100 may not include the GNSS receiver 130. The memory 150 may be integrated with the processor 160, and this set (that is, a chip set) may be used as the processor 160'.

The antennas 101 and the radio transceiver 110 are used for transmission and reception of radio signals. The radio transceiver 110 converts a baseband signal (a transmission signal) output from the processor 160 into a radio signal and transmits the radio signal through the antennas 101. The radio transceiver 110 converts a radio signal received through the antennas 101 into a baseband signal (a reception signal) and outputs the baseband signal to the processor 160.

The user interface 120 is an interface with the user who carries the UE 100, and includes, for example, a display, a microphone, a speaker, various kinds of buttons, and the like. The user interface 120 receives an operation from the user, and outputs a signal indicating content of the received operation to the processor 160. In order to obtain position information indicating a geographical position of the UE 100, the GNSS receiver 130 receives a GNSS signal and outputs the received signal to the processor 160. The battery 140 accumulates electric power to be supplied to the respective blocks of the UE 100.

The memory 150 stores a program executed by the processor 160 and information used for a process performed by the processor 160. The processor 160 includes a baseband processor that perform, for example, modulation, demodulation, encoding, and decoding of the baseband signal and a central processing unit (CPU) that performs various kinds of processes by executing the program stored in the memory 150. The processor 160 may include a codec that encodes and decodes audio and video signals. The processor 160 executes various kinds of processes which will be described later and various kinds of communication protocols.

Figure 3:
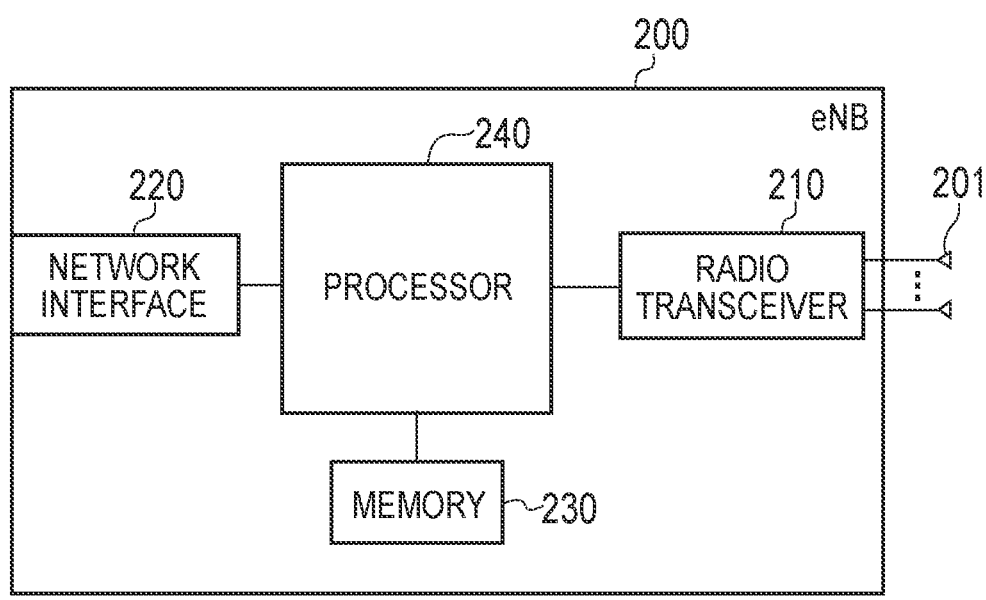
FIG. 3 is a block diagram of an eNB 200 according to the embodiment.

FIG. 3 is a block diagram illustrating the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. The radio transceiver 210 (and/or the network interface 220) and the processor 240 constitute a transmitting unit and a receiving unit. The memory 230 may be integrated with the processor 240, and this set (that is, a chip set) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal through the antenna 201. The radio transceiver 210 converts a radio signal received by the antenna 201 into a baseband signal (a reception signal), and outputs the baseband signal to the processor 240.

The network interface 220 is connected with a neighboring eNB 200 via the X2 interface and connected with the MME/S-GW 300 via the S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that perform, for example, modulation, demodulation, encoding, and decoding of the baseband signal and a CPU that performs various kinds of processes by executing the program stored in the memory 230. The processor 240 executes various kinds of processes which will be described later and various kinds of communication protocols.

Figure 4:
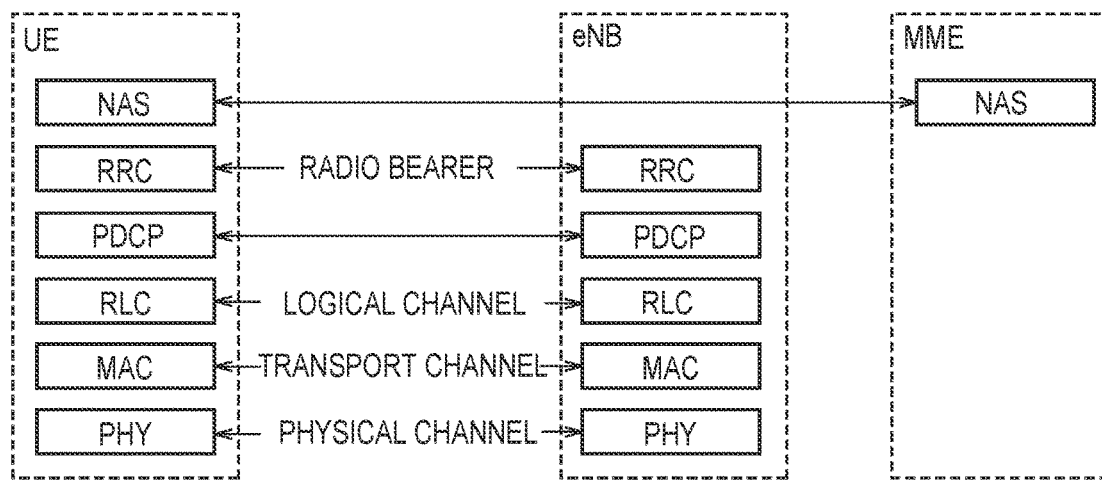
FIG. 4 is a protocol stack diagram of a radio interface according to the embodiment.

FIG. 4 is a protocol stack diagram of a radio interface in the LTE system. A radio interface protocol is classified into first to third layers of an OSI reference model, and the first layer is a physical (PHY) layer as illustrated in FIG. 4. The second layer includes a medium access control (MAC) layer, a radio link control (RLC) layer, and a packet data convergence protocol (PDCP) layer. The third layer includes a radio resource control (RRC) layer.

The PHY layer performs encoding/decoding, modulation/demodulation, antenna mapping/demapping, and resource mapping/demapping. User data and control information are transmitted through a physical channel between the PHY layer of the UE 100 and the PHY layer of the eNB 200.

The MAC layer performs preferential control of data, a retransmission process by hybrid ARQ (HARQ), a random access sequence, and the like. User data and control information are transmitted through a transport channel between the MAC layer of the UE 100 and the MAC layer of the eNB 200. The MAC layer of the eNB 200 includes a scheduler for deciding transport formats (a transport block size and a modulation and coding scheme (MCS)) of an uplink and a downlink and a resource block to be allocated to the UE 100.

The RLC layer transmits data to an RLC layer of a reception side using the functions of the MAC layer and the PHY layer. User data and control information are transmitted through a logical channel between the RLC layer of the UE 100 and the RLC layer of the eNB 200.

The PDCP layer performs header compression/decompression and encryption/decryption. It should also be noted that in the PDCP layer, a receiving entity for receiving data unit (PDCP PDU) or a transmitting entity for transmitting a data unit (PDCP PDU) is formed.

The RRC layer is defined only in a control plane in which control information is dealt with. Control information (an RRC message) for various kinds of settings is transmitted between the RRC layer of the UE 100 and the RRC layer of the eNB 200. The RRC layer controls the logical channel, the transport channel, and the physical channel in response to establishment, re-establishment, and release of the radio bearer. When there is a connection (an RRC connection) between the RRC of the UE 100 and the RRC of the eNB 200, the UE 100 is in an RRC connected state, and when there is no connection (RRC connection) between the RRC of the UE 100 and the RRC of the eNB 200, the UE 100 is in an RRC idle state.

A non-access stratum (NAS) layer positioned above the RRC layer performs session management, mobility management, and the like.

Figure 5:
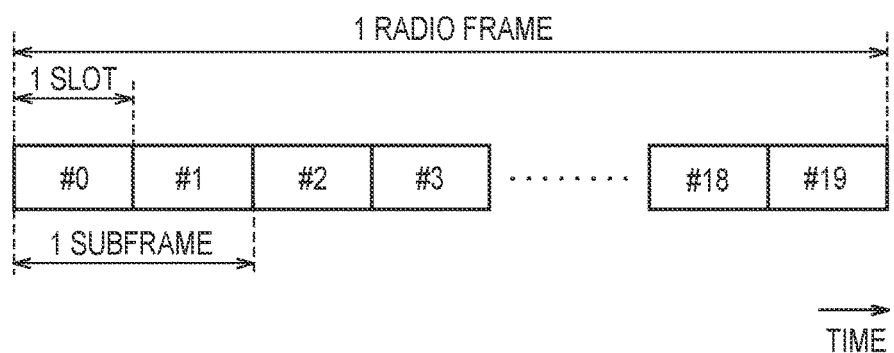
FIG. 5 is a configuration diagram of a radio frame used in the LTE system according to the embodiment.

FIG. 5 is a diagram illustrating a radio frame used in the LTE system. In the LTE system, Orthogonal Frequency Division Multiplexing Access (OFDMA) is applied for downlink, and Single Carrier Frequency Division Multiple Access (SC-FDMA) is applied for uplink.

A radio frame is configured with 10 subframes arranged in a time direction as illustrated in FIG. 5. Each subframe is configured with two slots arranged in the time direction. A length of each subframe is 1 ms, and a length of each slot is 0.5 ms. Each subframe includes a plurality of resource blocks (RBs) in a frequency direction and includes a plurality of symbols in the time direction. Each resource block includes a plurality of sub carriers in the frequency direction. One resource element (RE) is configured with one symbol and one sub carrier. Among radio resources (time and frequency resources) allocated to the UE 100, the frequency resources can be specified by resource blocks, and the time resources can be specified by subframes (or slots).

(Application Scene)

Figure 6:
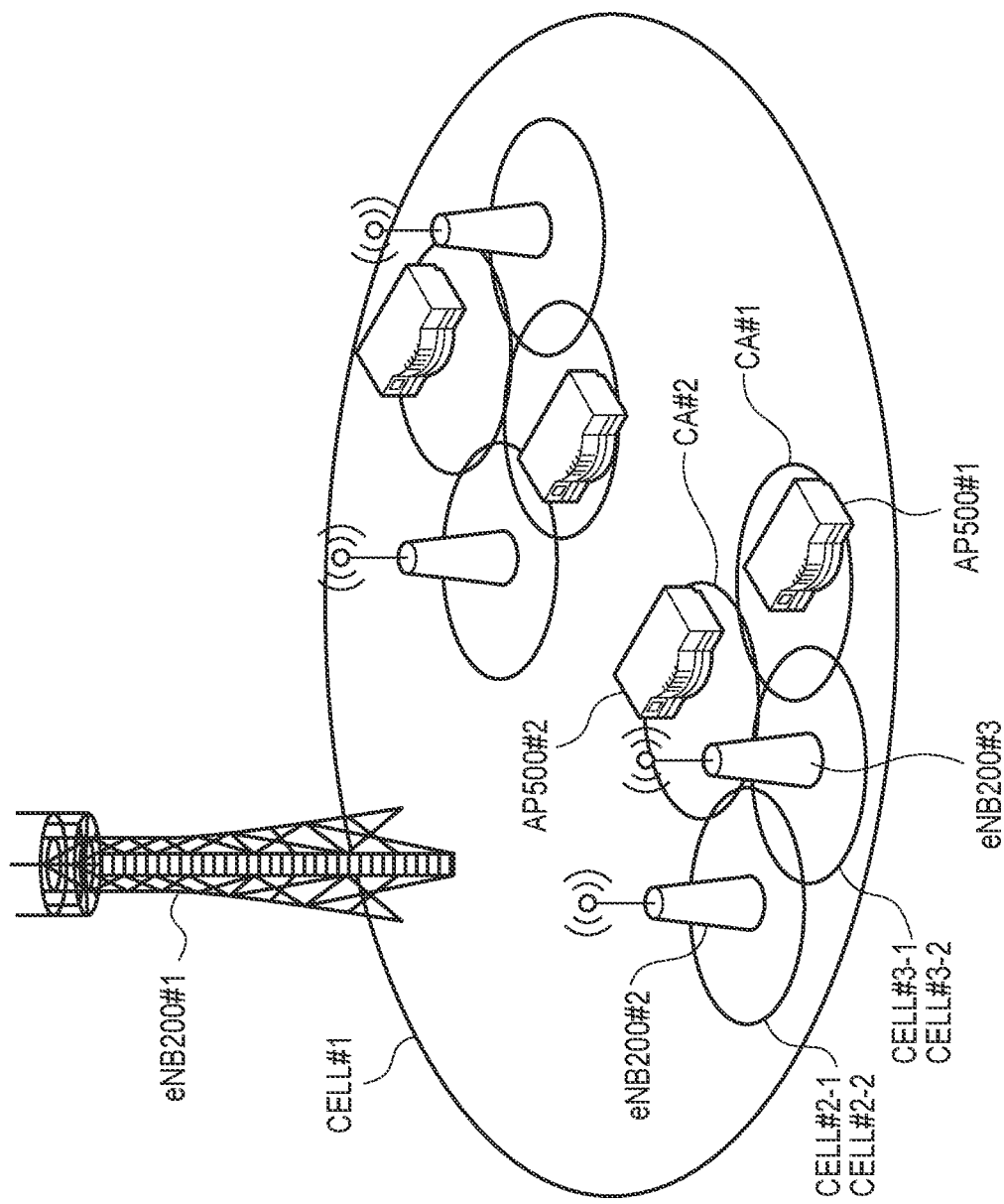
FIG. 6 is a diagram for illustrating an application scene according to the embodiment.

Hereinafter, an application scene will be described. FIG. 6 is a diagram for illustrating an application scene according to the embodiment.

As illustrated in FIG. 6, a mobile communication system has a plurality of eNBs (for example, eNB 200#1, eNB 200#2, and eNB 200#3) and a plurality of APs (AP 500#1 and AP 500#2).

The eNB 200#1 is an eNB 200 which are installed by a telecommunications carrier, for example. The eNB 200#1 has a cell #1 as a radio communication area. In the cell #1, a licensed band which requires a license is used. The Licensed Band is an example of a band assigned to the telecommunications carrier (hereinafter, referred to as the telecommunications carrier band).

The eNB 200#2 and the eNB 200#3 are eNBs 200 which are set by the telecommunications carrier. However, the eNB 200#2 may be installed by a third party that is different from the telecommunications carrier. The eNB 200#2 has a cell #2-1 and a cell #2-2 as radio communication areas, and the eNB 200#3 has a cell #3-1 and a cell #3-2 as radio communication areas. In the cell #2-1 and the cell #3-1, the telecommunications carrier band is used as in the cell #1. On the other hand, in the cell #2-2 and the cell #3-2, an unlicensed band which does not require a license is used. The Unlicensed Band is an example of a specific frequency band in which utilization of a plurality of telecommunications carriers or a plurality of communication systems are permitted.

The AP 500#1 and the AP 500#2 are access points which are used in Wi-Fi (registered trademark), Bluetooth (registered trademark) or the like. The AP 500#1 has a coverage area CA#1 as a radio communication area, and the AP 500#2 has a coverage area CA#2 as a radio communication area. In the coverage area CA#1 and the coverage area CA#2, the Unlicensed Band is used like the cell #2-2 and the cell #3-2.

In such a presupposition, in the embodiment, a novel concept referred to as an element carrier used in the PHY layer is introduced as to the second component carrier included in the Unlicensed Band.

Specifically, the communication apparatuses (UE 100 and eNB 200) each include: a first processing unit (hereinafter, referred to as the PHY layer) to perform processing of a first layer (hereinafter, referred to as the PHY layer); and a second processing unit (hereinafter, referred to as the MAC layer) to perform processing of a second layer (hereinafter, referred to as the MAC layer) that is provided to be upper than the first layer. The first processing unit and the second processing unit are part of the functions of a processor 160 and a processor 240, respectively. Further, the first layer is not limited to the PHY layer, and may be the MAC layer, an RLC layer, a PDCP layer, and an RRC layer or the like. In addition, the second layer is not limited to the MAC layer, and may be the RLC layer, the PDCP layer, and PPC layer or the like.

Figure 7A:
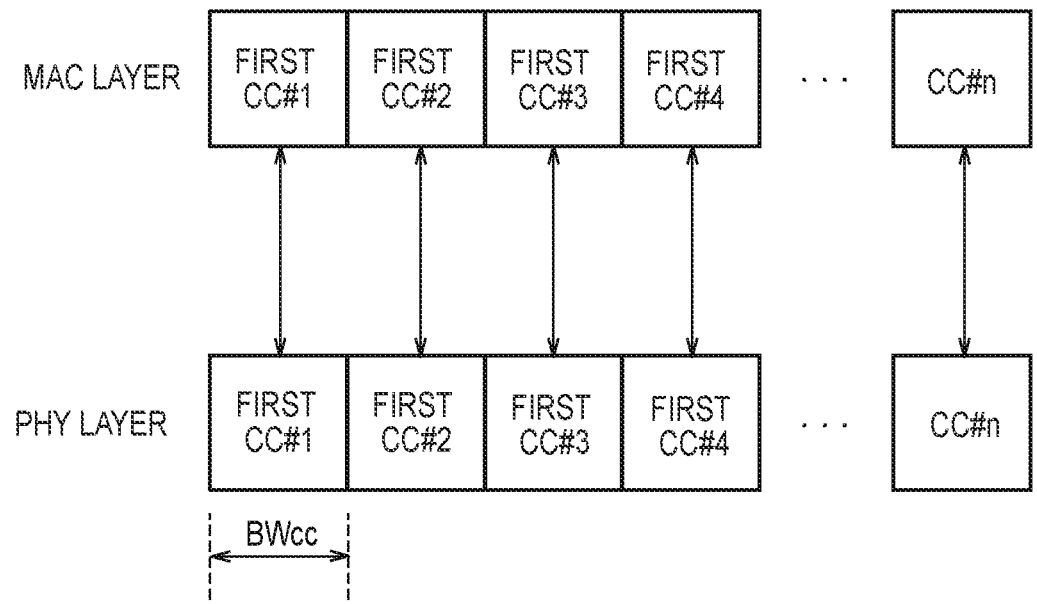
FIG. 7 is a diagram for illustrating a CC and an EC according to the embodiment.
Figure 7B:
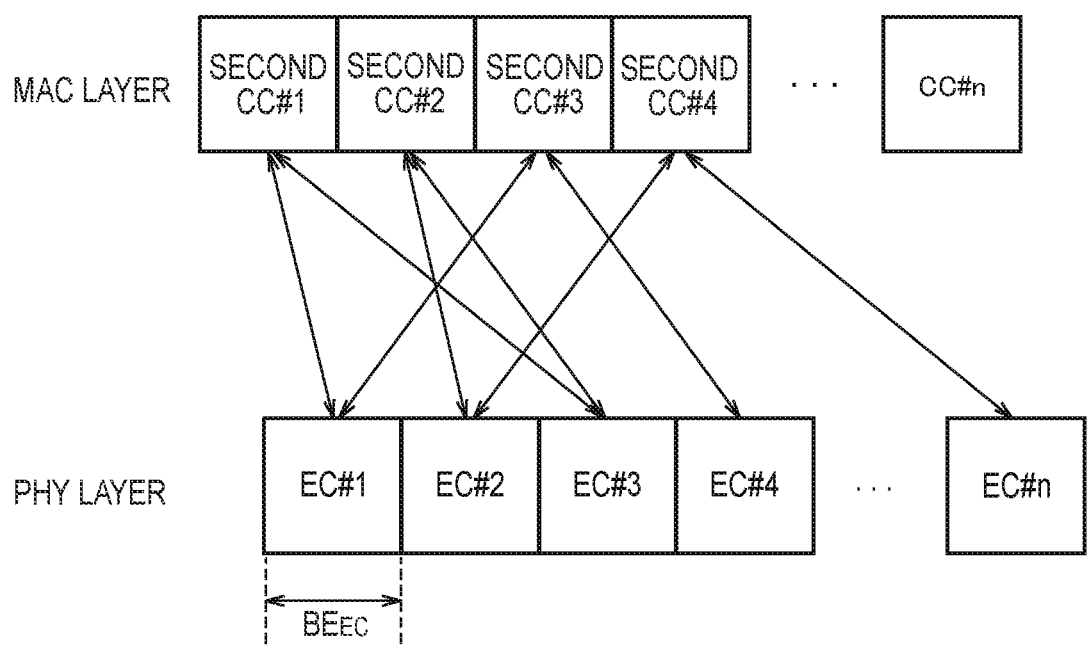

Here, as to the Licensed Band, as illustrated in FIG. 7 (A), the MAC layer performs communication by using the first component carrier (hereinafter, referred to as the first CC) included in the Licensed Band. The PHY layer performs communication by using the first CC included in the Licensed Band. Here, the first CC that is recognized in the MAC layer (HARQ process) has a one-to-one relationship with the first CC used as a physical carrier in the PHY layer.

On the other hand, as to the Unlicensed Band, as illustrated in FIG. 7 (B), the MAC layer performs communication by using the second component carrier (hereinafter, referred to as the second CC) included in the Unlicensed Band). The PHY layer performs communication by using an element carrier (hereinafter, referred to as EC) selected from among a plurality of ECs associated with the second component carrier included in the Unlicensed Band. Here, the second CC that is recognized in the MAC layer (HARQ process) has a one-to-multiple relationship with the EC used as a physical carrier in the PHY layer. Further, a bandwidth ($BW_{EC}$) of a respective one of the plurality of element carriers that the PHY layer uses as a physical carrier in the Unlicensed Band may be the same as a bandwidth ($BW_{CC}$) of the first CC used in the Licensed Band. In other words, a bandwidth ($BW_{EC}$) of the EC used in the Unlicensed Band may be the same as the bandwidth ($BW_{CC}$) of the first CC used in the Licensed Band. In addition, a bandwidth ($BW_{EC}$) of the EC used in the Licensed Band may be the same as a bandwidth ($BW_{CC}$) of the second CC used in the Licensed Band.

Figure 8:
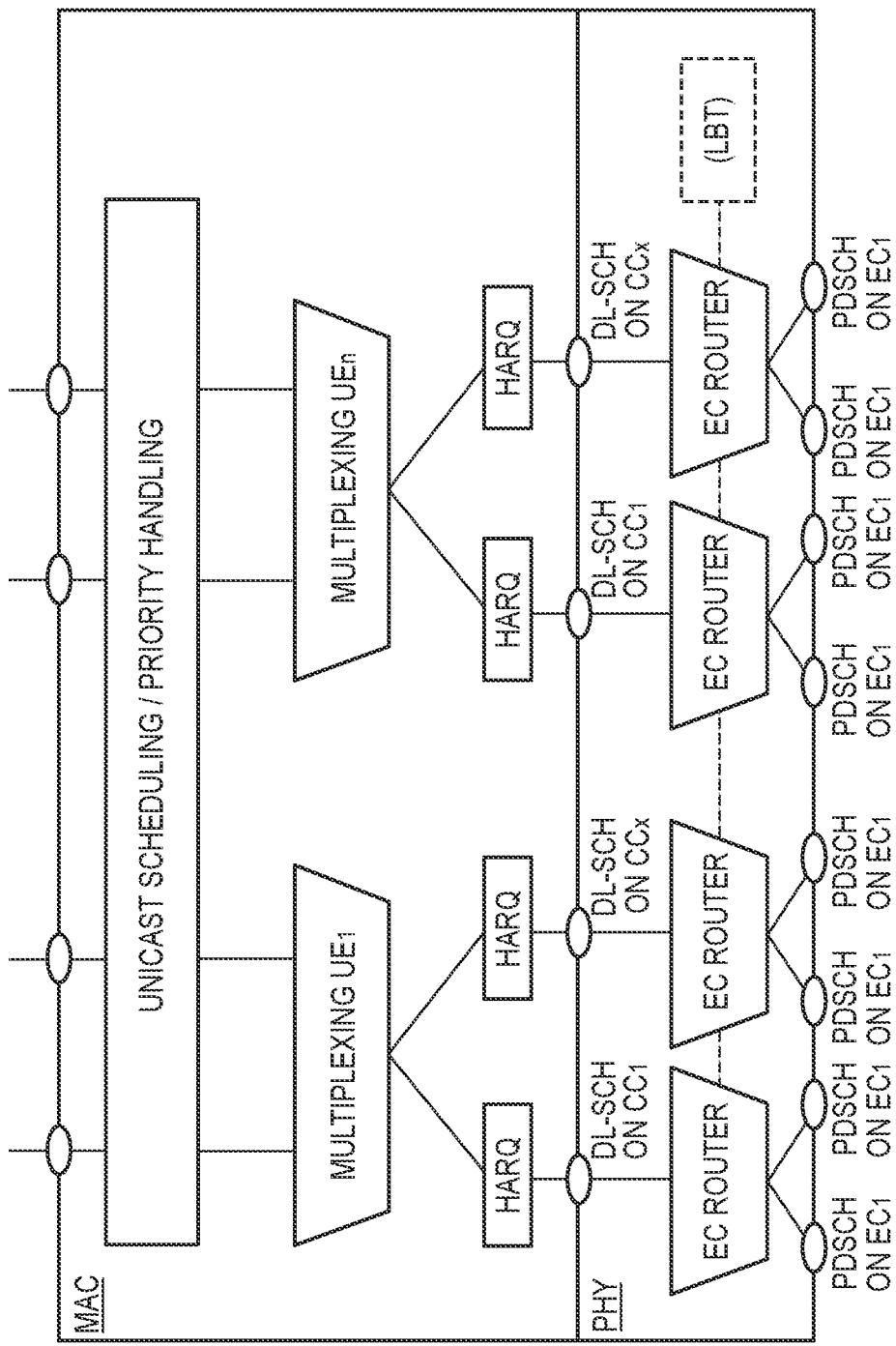
FIG. 8 is a diagram showing a structure of an MAC layer and a PHY layer of the eNB 200 according to the embodiment.

Although the framework associated with the Unlicensed Band mentioned above is applied to both of the UE 100 and the eNB 200, the eNB 200 is shown as an example here. The structure of the MAC layer and the PHY layer of the eNB 200 that has applied the framework associated with the Unlicensed Band mentioned above is as illustrated in FIG. 8. As illustrated in FIG. 8, the HARQ process of the MAC layer is provided for each CC. On the other hand, an EC router of the PHY layer routes a path between one CC and an EC selected from among the plurality of ECs. Therefore, it is to be noted that the MAC layer does not need to recognize which EC is to be used.

In the embodiment, the plurality of ECs associated with the second CC may be specified by a message of the third layer (RRC layer) that is provided to be upper than the second layer (MAC layer). Such a message may be, for example, a message to be individually transmitted to the UE 100 (for example, RRC Connection Reconfiguration) or may be a message to be broadcasted to the UE 100 (for example, SIB: System Information Block).

In the embodiment, a radio resource (that is, EC) of the Unlicensed Band may be scheduled by a radio resource (that is, first CC) of the Licensed Band (Cross Carrier Scheduling). In other words, a radio transceiver 210 of the eNB 200 constitutes a communication unit to notify to the UE 100 a target EC which is an EC used in communication of data between the eNB 200 and the UE 100. The radio transceiver 210 of the eNB 200 notifies the target EC by using the first CC. Here, communication of data between the eNB 200 and the UE 100 may be downlink communication of data from the eNB 200 to the UE 100 or may be uplink communication of data from the UE 100 to the eNB 200.

Further, the Unlicensed Band may be used on the presupposition that it is connected to the Licensed Band. In such a case, the cell used in the Licensed Band is referred to as a primary cell (hereinafter, referred to as the PCell), and the cell used in the Unlicensed band is referred to as a secondary cell (hereinafter, referred to as the SCell).

In the embodiment, the eNB 200, in the target EC that is the EC used in communication of data (downlink communication) from the eNB 200 to the UE 100, comprises a resource allocation unit (for example, radio transceiver 200 and processor 240) to transmit to the UE 100 a resource allocation signal to specify a resource for transmitting data from the eNB 200 (DCI (Downlink Control Information) included in RA (Resource Allocation). The resource allocation signal (DCI) may include information for specifying the target EC. However, a transmission timing of the resource allocation signal (DCI) to specify the resource actually used in downlink communication may be different from a transmission timing of the information for specifying the target EC (EC Indication). Therefore, as an extension of the DCI format, the DCI may include EC indication. The extended DCI, for example, in addition to a CIF (Component carrier Indication) field, includes an EIF (Elementary carrier Indication) field. Further, when the EC information is stored in the EIF field, storage of the CC information to the COF field may be omitted.

Alternatively, the eNB 200, in the target EC that is the EC used in communication of data (uplink communication) from the UE 100 to the eNB 200, comprises a resource allocation unit (for example, radio transceiver 200 and processor 240) to transmit to the UE 100 a resource allocation signal (UL Grant) to specify a resource for receiving data from the UE 100. The resource allocation signal (UL Grant) may include an EC candidate used as the target EC (EC List). However, the transmission timing of the resource allocation signal (UE Grant) to specify the resource actually used in uplink communication may be different from the transmission timing of the EC candidate (EC List). Therefore, as an extension of the format of UL Grant, the UL Grant may include the EC List. The extended UL Grant, for example, in addition to the CIF (Component carrier Indication) field, includes the EIF (Elementary carrier Indication) field. Further, when the EC information is stored in the EIF field, storage of the CC information to the CIF field may be omitted. In addition, when the EC information is not stored in the EIF field, the EC information specified as default may be used. The EC information specified as default may be EC information which is predetermined in the communication system or may be EC information which is notified in advance by any other method.

(Communication Method)

Figure 9:
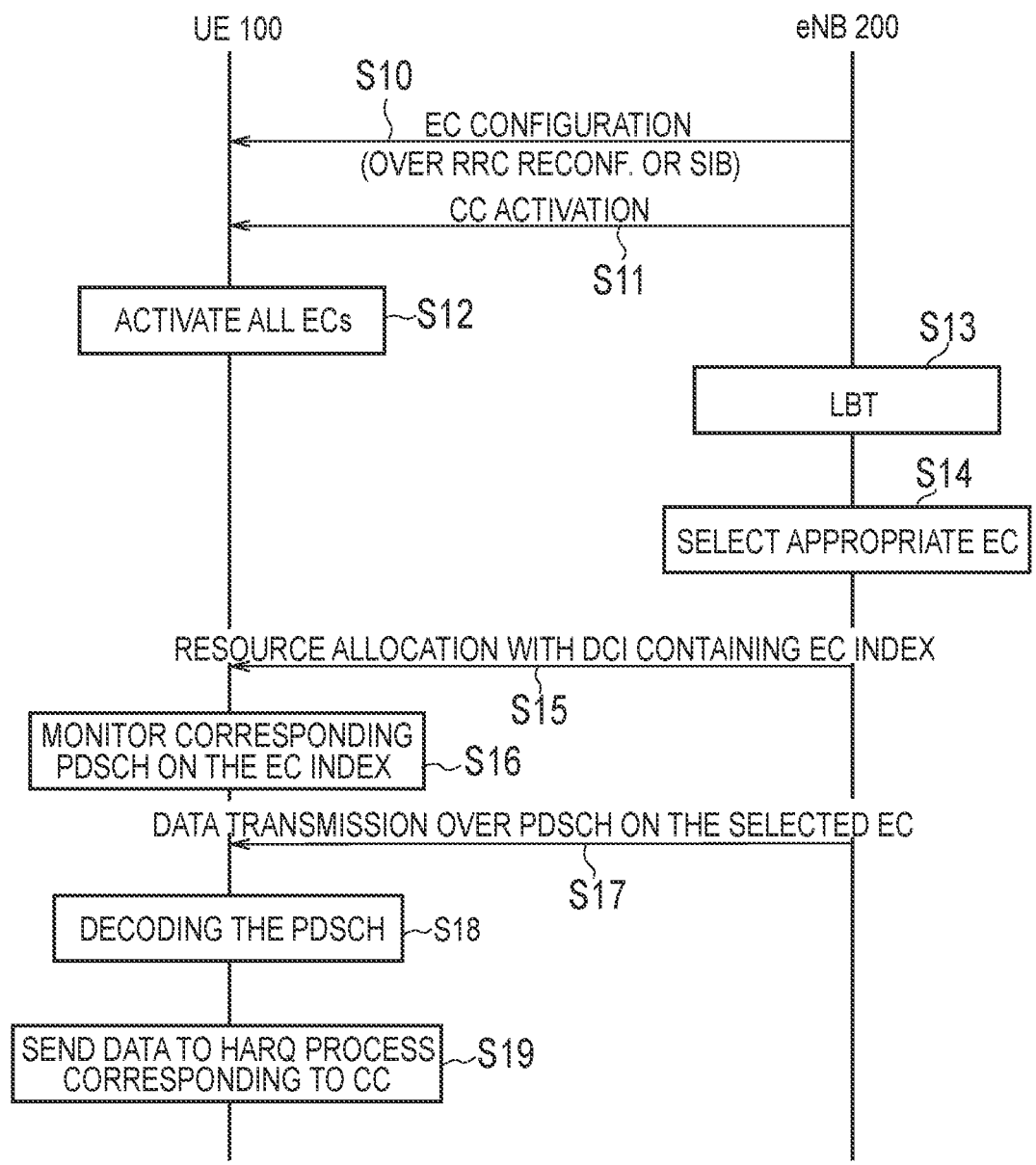
FIG. 9 is a sequential diagram showing a communication method according to the embodiment.

Hereinafter, a communication method according to the embodiment will be described. FIG. 9 is a sequential diagram showing the communication method according to the embodiment. Here, downlink communication in which cross carrier scheduling is applied is shown as an example.

As illustrated in FIG. 9, in step S10, the eNB 200 notifies to the UE 100 a message (EC configuration) indicating a plurality of ECs associated with the second CC. The EC configuration, as described above, may be included in the RRC Connection Reconfiguration) or may be included in the SIB.

In step S11, the eNB 200 transmits to the UE 100 a message (CC Activation) to instruct activation of the second CC (SCell setting) in order to start utilization of the Unlicensed Band.

In step S12, the UE 100 (MAC layer) activates the second CC to set the SCell and notifies to the UE 100 (PHY layer) the fact that the second CC has been activated. The UE 100 (PHY layer) activates all of the ECs associated with the second CC.

In step S13, as to a respective one of the plurality of ECs associated with the second CC, the eNB 200 monitors whether or not interference of Wi-Fi or the like is observed (LBT: Listen Before Talk).

In step S14, the eNB 200 selects the target EC used in downlink communication. In more detail, the eNB 200 selects, as the target EC, the EC for which interference of Wi-Fi or the like has not be observed.

In step S15, the eNB 200 transmits to the UE 100 a message (RA: Resource Allocation) which includes information (EC index) indicating the target EC used in downlink communication. The eNB 200 may transmit the RA by using the first CC. Further, the information (EC index) indicating the target EC) may be an identifier which is associated with the target EC.

In step S16, the UE 100 (PHY layer), in the target EC that corresponds to the information (EC index) included in the RA, monitors data (PDSCH) to be transmitted from the eNB 200. Further, the PDSCH used here may be the PDSCH corresponding to the target EC.

In step S17, the eNB 200 transmits data (PDSCH) by using the target EC selected in step S14.

In step S18, the UE 100 (PHY layer) receives the data (PDSCH) and decodes the data (PDSCH). In this manner, the UE 100 (PHY layer) acquires the data (decoded data) that is transmitted on the PDSCH in step S17.

In step S19, the PHY layer of the UE 100 outputs the decoded data to the MAC layer (HARQ process) of the UE 100 that corresponds to the CC associated with the target EC.

(Functions and Advantageous Effects)

In the embodiment, the PHY layer that is provided to be lower than the MAC layer to perform communication by using the second CC performs communication by using the EC selected from among the plurality of ECs associated with the second CC. That is, by introducing a novel concept referred to as an element carrier used in the PHY layer, it is possible to perform switching of the element carrier in the PHY layer, and the interference of Wi-Fi, Bluetooth (registered trademark) or the like can be avoided.

Modification Example 1

Hereinafter, Modification Example 1 of the embodiment will be described. In Modification Example 1, a timing of specifying a target EC and a timing of specifying a resource in the target EC will be described. The timing of specifying the target EC is a transmission timing of the information for specifying the target EC (EC Indication) and the timing of specifying a resource in the target EC is a transmission timing of a resource allocation signal (RA: Resource Allocation). Here, downlink communication in which cross carrier scheduling is applied is shown as an example. That is, a case in which both of the information for specifying the target EC (EC Indication) and the resource allocation signal (RA) are transmitted from the PCell is shown as an example.

Figure 10:
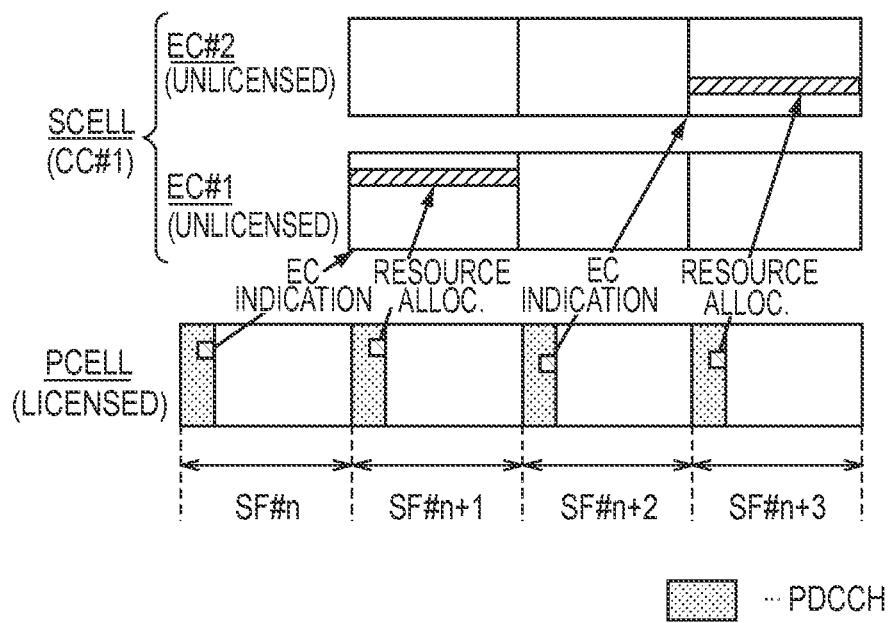
FIG. 10 is a diagram for illustrating Modification Example 1.

Specifically, the radio transceiver 210 of the eNB 200 may notify the target EC in a second subframe earlier than a first subframe which is a subframe used in communication of data. For example, as illustrated in FIG. 10, in a case in which the subframe used in communication of data is SF#n+1, the PCell transmits the information for specifying the target EC (EC Indication), by the PDCCH of which SF#n is earlier than SF#n+1. On the other hand, the PCell transmits the resource allocation signal (RA) indicating the resource in the target EC, by the PDCCH of which SF#n is earlier than SF#n+1. Further, the UE 100 sets the EC targeted to be monitored, to EC#1, in SF#n.

Figure 11:
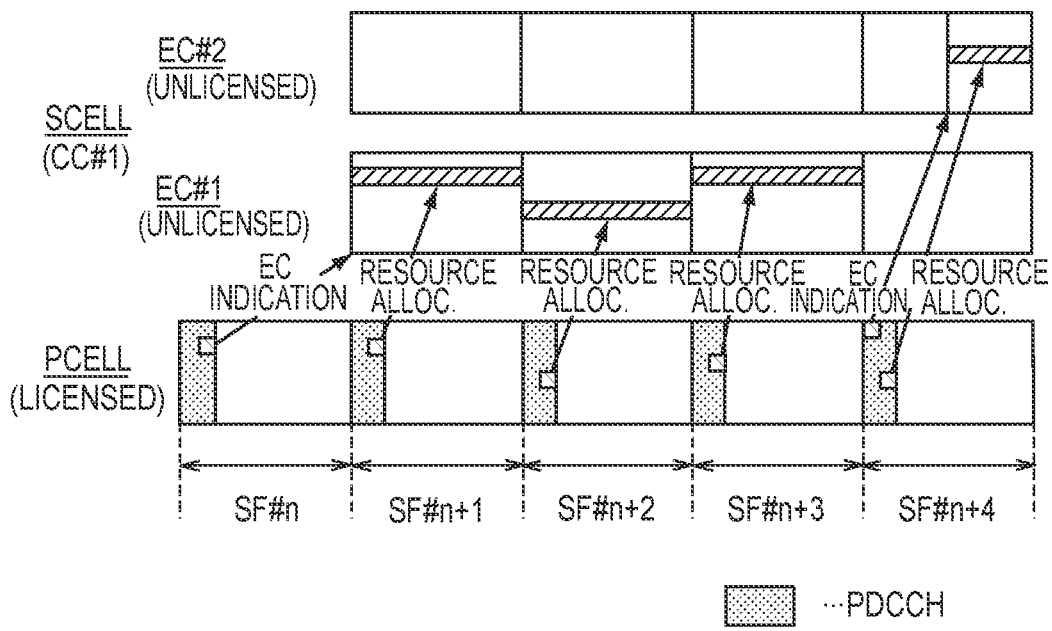
FIG. 11 is a diagram for illustrating Modification Example 1.

Alternatively, the radio transceiver 210 of the eNB 200 notifies the target element carrier in the subframe used in communication of data. The data is communicated by using a later slot of the two slots that constitute the subframe. For example, as illustrated in FIG. 11, in a case in which the subframe used in communication of data is SF#n+4, the PCell transmits the information for specifying the target EC (EC Indication), by the PDCCH of SF#n+4. On the other hand, the PCell transmits the resource allocation signal (RA) indicating the resource in the target EC, by the PDCCH of SF#n+4. Further, the UE 100 switches the EC targeted to be monitored, from C#1 to EC#2, in the earlier slot of SF#n+4, and receives data (PDSCH) in the later slot of SF#n+4.

Although Modification Example 1 was described as to downlink communication in which cross carrier scheduling is applied, it is to be noted that Modification Example 1 is also applicable to uplink communication in which cross carrier scheduling is applied.

Modification Example 2

Hereinafter, Modification Example 2 of the embodiment will be described. In Modification Example 2, a timing of specifying a target EC and a timing of specifying a resource in the target EC will be described. The timing of specifying the target EC is a transmission timing of information for specifying the target EC (EC Indication), and the timing of specifying the resource in the target EC is a transmission timing of a resource allocation signal (RA: Resource Allocation). Here, downlink communication in which cross carrier scheduling is not applied is shown as an example. That is, a case in which the information for specifying the target EC (EC Indication) is transmitted from the PCell and the resource allocation signal (RA) is transmitted from the SCell is shown as an example.

Figure 12:
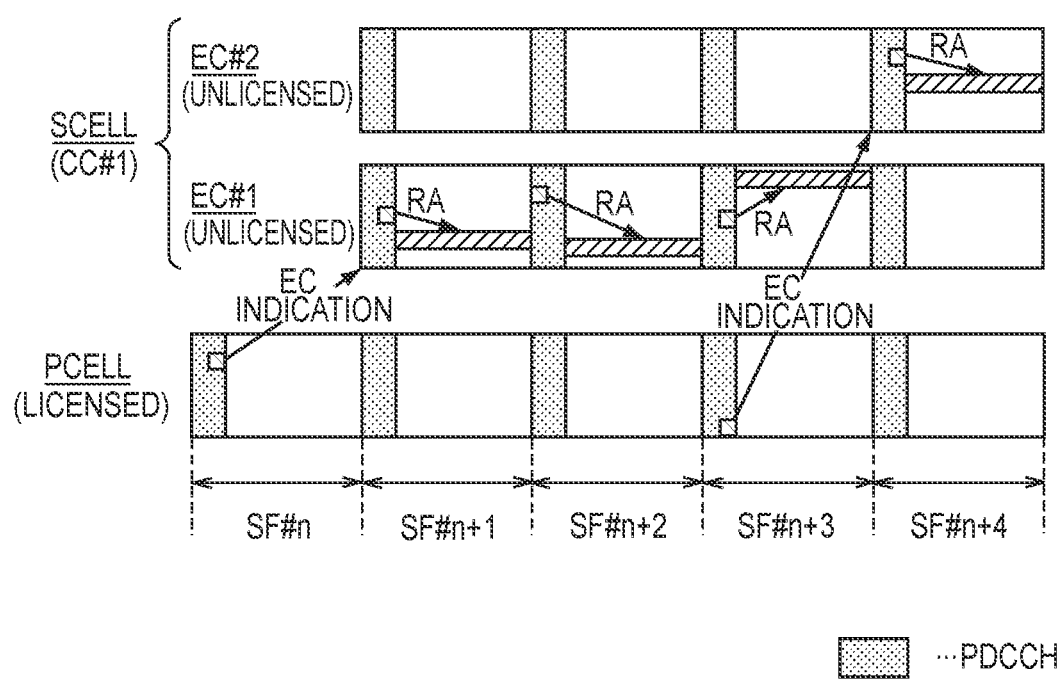
FIG. 12 is a diagram for illustrating Modification Example 2.

Specifically, the radio transceiver 210 of the eNB 200 may notify the target EC in a second subframe earlier than a first subframe which is a subframe used in communication of data. For example, as illustrated in FIG. 12, in a case in which the subframe used in communication of data is SF#n+1, the PCell transmits the information for specifying the target EC (EC Indication), by the PDCCH of which SF#n is earlier than SF#n+1. On the other hand, the SCell transmits the resource allocation signal (RA) indicating the resource in the target EC, by the PDCCH of SF#n+1. Further, the UE 100 sets the EC targeted to be monitored, to EC#1, in SF#n. Similarly, in a case in which the subframe used in communication of data is SF#n+4, the PCell transmits information for specifying a target EC (EC Indication), by the PDCCH of SF#n+3 which is earlier than SF#n+4. On the other hand, the SCell transmits the resource allocation signal (RA) indicating the resource in the target EC, by the PDCCH of SF#n+4. Further, the UE 100 switches the EC targeted to be monitored, from EC#1 to EC#2, in SF#n+3. At this time, it may be that the IE 100, in the earlier slot of SF#n+3, receives data (PDSCH) while the monitoring target is EC#1, and in the later slot of SF#n+3, switches the EC targeted to be monitored, from EC#1 to EC#2. In addition, the UE 100 may specify the ECs targeted to be monitored, as both of EC#1 and EC#2, in place of switching the EC targeted to be monitored, from EC#1 to EC#2.

Although Modification Example 2 was described as to downlink communication in which cross carrier scheduling is not applied, it is to be noted that Modification Example 2 is also applicable to uplink communication in which cross carrier scheduling is not applied.

Modification Example 3

Hereinafter, Modification Example 3 of the embodiment will be described. In Modification Example 3, a transmission timing of a resource allocation signal (XCS w/EC) indicating a resource for communicating data and a target EC and a timing of starting communication of data will be described. Here, downlink communication in which cross carrier scheduling is applied is shown as an example. That is, a case in which the resource allocation signal (XCS w/EC) indicating the resource for communicating data and the target EC is transmitted from the PCell is shown as an example.

Specifically, the radio transceiver 210 of the eNB 200 notifies to the UE 100 the target EC that is the EC used in communication of data between the eNB 200 and the UE 100. In the subframe used in communication of data, the radio transceiver 210 of the eNB 200 transmits to the UE 100 the resource allocation signal (XCS w/EC) indicating the resource for communicating data and the target EC. The transmission timing of the resource allocation signal is earlier than a communication timing of data, and a time interval between the transmission timing of the resource allocation signal and the communication timing of the data is longer than a time interval required to switch the target EC.

Figure 13:
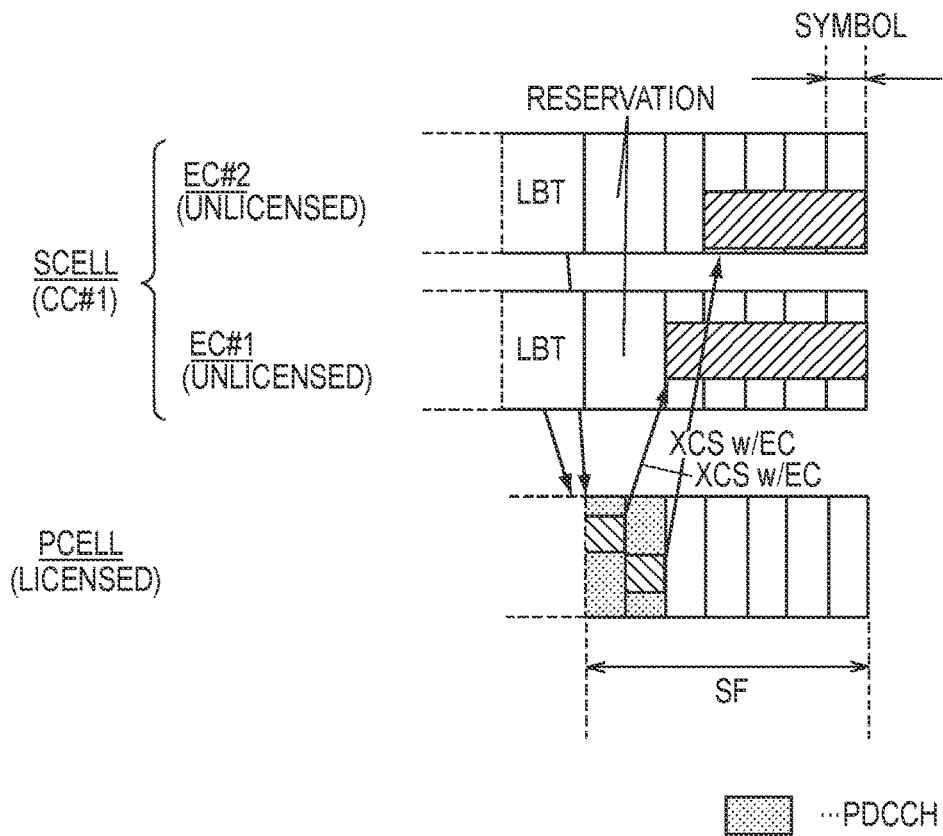
FIG. 13 is a diagram for illustrating Modification Example 3.

For example, as illustrated in FIG. 13, at the first symbol interval, as to communication of data starting from the third symbol interval, the PCell transmits to the UE 100 the resource allocation signal (XCS w/EC) indicating the resource for communicating data and the target EC. The UE 100 switches the EC targeted to be monitored, to EC#1, at the second symbol. Alternatively, at the second symbol, as to communication of data starting from the fourth symbol interval, the PCell transmits to the UE 100 the resource allocation signal (XCS w/EC) indicating the resource for communicating data and the target EC. The UE 100 switches the EC targeted to be monitored, to EC#1, in the third symbol. That is, in the example shown in FIG. 13, the time interval between the transmission timing of the resource allocation signal and the communication timing of the data is a one-symbol interval, and the time interval required to switch the target EC is less than the one-symbol interval.

However, Modification Example 3 is not limited thereto. The time interval required to switch the target element carrier may be determined based on the capability of the UE 100 (UE Capability). Further, the radio transceiver 210 of the eNB 200 receives the capability of the UE 100 (UE Capability) from the UE 100. A timing of receiving the capability of the UE 100 (UE Capability) is arbitrary.

Alternatively, the time interval required to switch the target element carrier may be specified by a message of the RRC layer that is provided to be upper than the MAC layer. Such a message of the RRC layer is transmitted from the UE 100 to the eNB 200.

Although Modification Example 3 was described as to downlink communication in which cross carrier scheduling is applied, it is to be noted that Modification Example 3 is also applicable to uplink communication in which cross carrier scheduling is applied.

Further, in FIG. 13, the SCell may transmit a reservation symbol (Reservation) at a timing at which the LBT has completed. By transmission of the reservation symbol, the target EC for which the LBT has been performed is restrained from being occupied by any other communication system or the like.

Modification Example 4

Hereinafter, Modification Example 4 of the embodiment will be described. In Modification Example 4, a case in which information for specifying a target EC (EC Indication) is not notified is shown as an example. Here, downlink communication is shown as an example.

Figure 14:
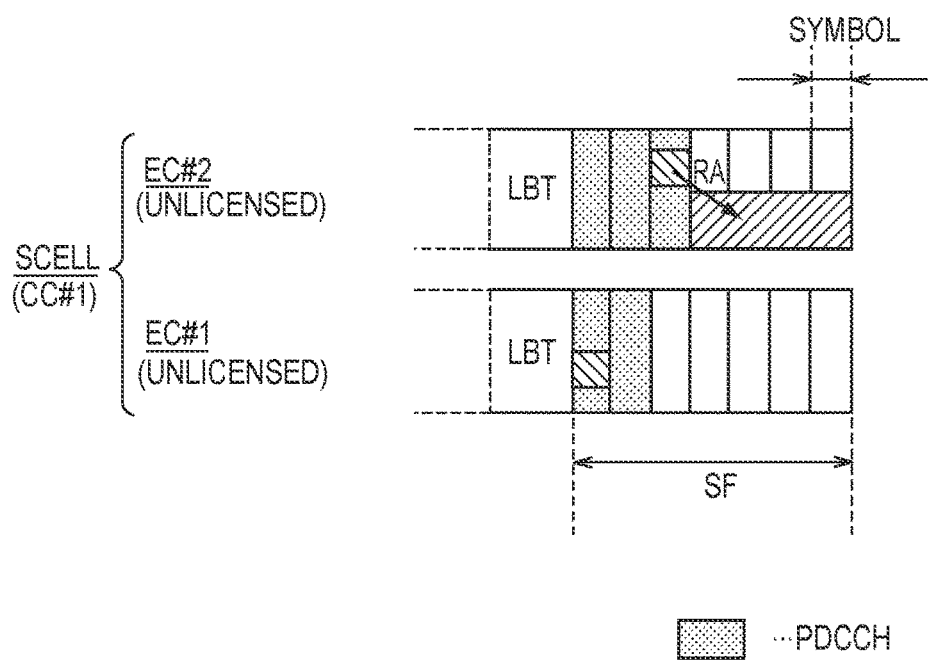
FIG. 14 is a diagram for illustrating Modification Example 4.

Specifically, as illustrated in FIG. 14, although the UE 100 monitors EC#1 at the first symbol interval, a resource allocation signal (RA) destined to a local terminal is not received. The UE 100 switches the EC targeted to be monitored, from EC#1 to EC#2, at the second symbol interval. The UE 100 monitors EC#2 in the third symbol interval and receives the resource allocation signal (RA) destined to the local terminal. In this manner, the UE 100 switches the EC targeted to be monitored, when the resource allocation signal (RA) destined to the local terminal is not received.

Although Modification Example 4 was described as to downlink communication, Modification Example 4 is also applicable to uplink communication.

Modification Example 5

Hereinafter, Modification Example 5 of the embodiment will be described. In Modification Example 5, a transmission timing of a resource allocation signal (XCS w/EC) indicating a resource for communicating data and a target EC and a communication timing of data will be described. Here, downlink communication in which cross carrier scheduling is applied is shown as an example. That is, a case in which the resource allocation signal (XCS w/EC) indicating the resource for communicating data and the target EC is transmitted from the PCell will be described.

Specifically, the radio transceiver 210 of the eNB 200 notifies to the UE 100 the target EC that is the EC used in communication of data between the eNB 200 and the UE 100. The radio transceiver 210 of the eNB 200, in the subframe used in communication of data, communicate with the UE 100 the resource allocation signal (XCS w/EC) indicating the resource for communicating data and the target EC. In the radio transceiver 210 of the eNB 200, a frame timing of a subframe using the Licensed Band is earlier than a frame timing of a subframe using the Unlicensed Band. An offset between the frame timing of the subframe using the Licensed Band and the frame timing of the subframe using the Unlicensed Band is longer than the time interval required to switch the target EC.

Figure 15:
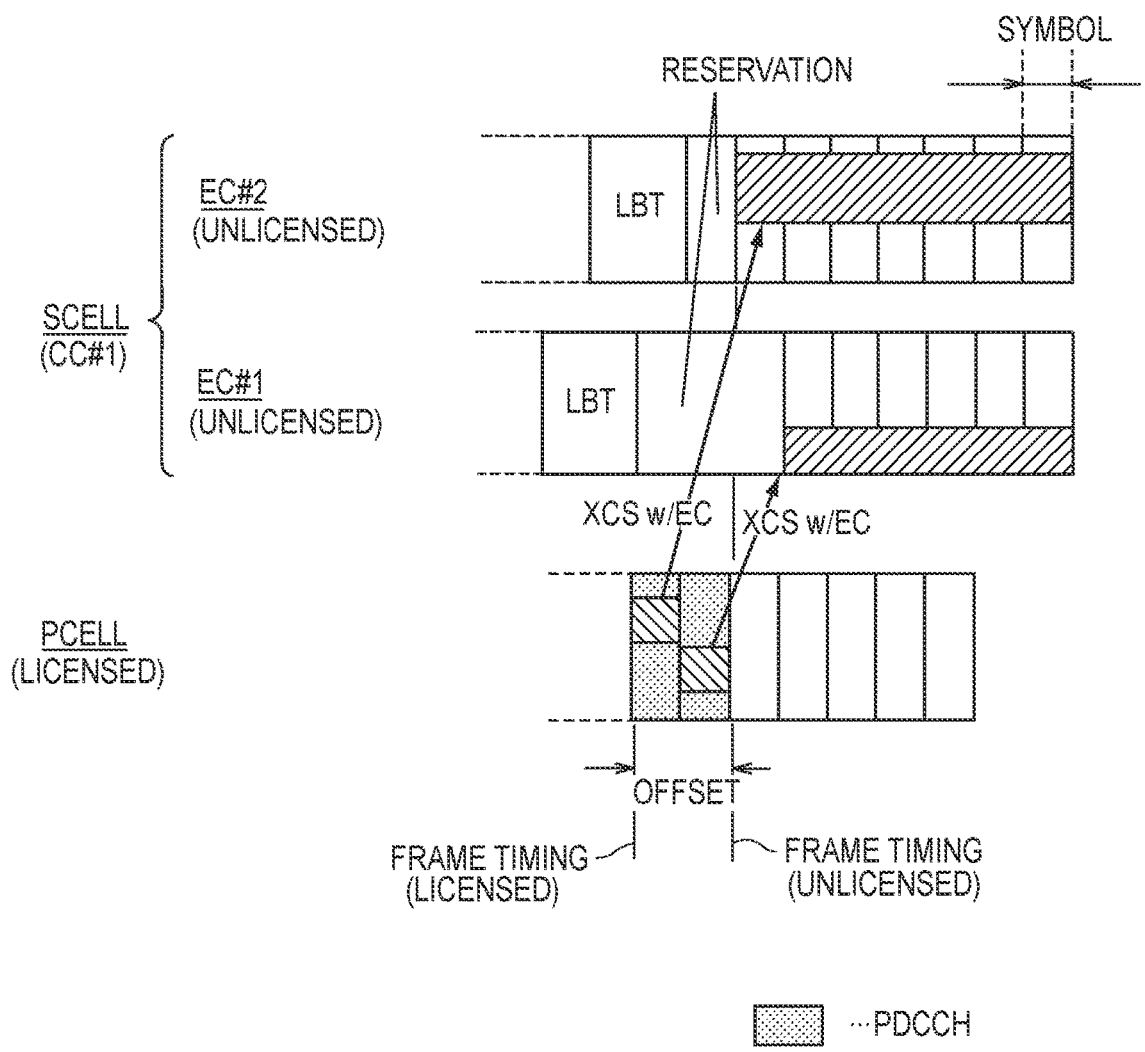
FIG. 15 is a diagram for illustrating Modification Example 5.

For example, as illustrated in FIG. 15, the frame timing (Licensed/PCell) of the subframe using the Licensed Band is earlier than the frame timing (Unlicensed/SCell) of the subframe using the Unlicensed Band. The offset between the frame timing (Licensed/PCell) and the frame timing (Unlicensed/SCell) is a two-symbol interval, and the time interval required to switch the target EC is a one-symbol interval, for example.

In such a case, at the first symbol interval in the Licensed Band, the PCell transmits to the UE 100 the resource allocation signal (XCS w/EC) indicating the resource for communicating data and the target EC. The SCell transmits data (PDSCH) at the first symbol interval in the Unlicensed Band (that is, the third symbol interval in the Licensed Band). Further, the UE 100 switches the EC targeted to be monitored, to EC#2, at the second symbol interval in the Licensed Band, for example. Alternatively, at the second symbol interval in the Licensed Band, the PCell transmits to the UE 100 the resource allocation signal (XCS w/EC) indicating the resource for communicating data and the target EC. The SCell transmits data (PDSCH) at the second symbol interval in the Unlicensed Band (that is, the fourth symbol interval in the Licensed Band). Further, the UE 100 switches the EC targeted to be monitored, to EC#1, at the third symbol interval in the Licensed Band.

However, Modification Example 5 is not limited thereto. The time interval required to switch the target element carrier may be determined based on the capability of the UE 100 (UE Capability). Further, the radio transceiver 210 of the eNB 200 receives the capability of the UE 100 (UE Capability) from the UE 100. The timing of receiving the capability of the UE 100 (UE Capability) is arbitrary.

Further, the offset may be specified by the message of the RRC layer that is provided to be upper than the Mac layer. Such a message of the RRC layer is transmitted from the eNB 200 to the UE 100. In this manner, the UE 100 can specify the frame timing in the Unlicensed Band.

In FIG. 15, the SCell may transmit a reservation symbol (Reservation) at a timing at which the LBT has completed. By transmission of the reservation symbol, the target EC for which the LBT has been performed is restrained from being occupied by any other communication system or the like.

Modification Example 6

Hereinafter, Modification Example 6 of the embodiment will be described. In Modification Example 6, uplink communication from the UE 100 to the eNB 200 will be mainly described.

Figure 16:
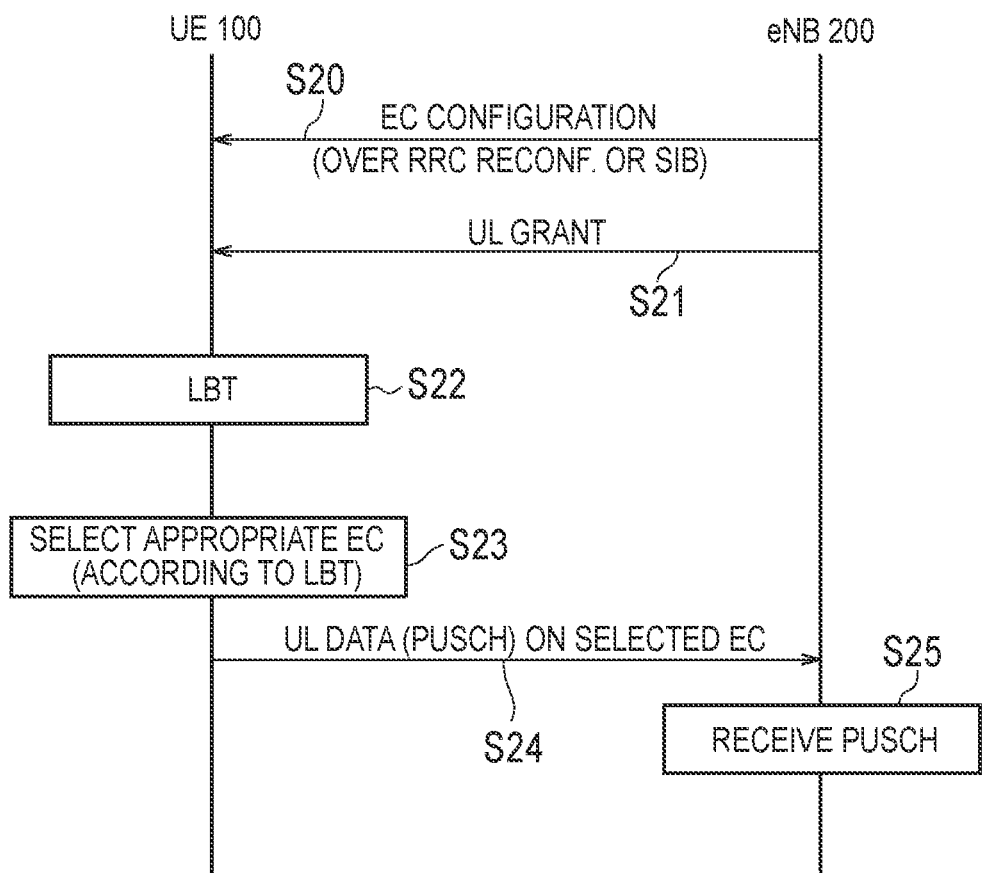
FIG. 16 is a diagram for illustrating Modification Example 6.

As illustrated in FIG. 16, in step S20, the eNB 200 notifies to the UE 100 a message (EC configuration) indicating a plurality of ECs associated with the second CC. The EC configuration, as described above, may be included in the RRC Connection Reconfiguration or may be included in the SIB.

In step S21, the eNB 200 transmits to the UE 100 a resource allocation signal (UL Grant) to specify a resource for receiving data from the UE 100. The resource allocation signal (UL Grant) may include an EC candidate (EC list) used as a target EC. Alternatively, when a correlation between the second CC and the plurality of ECs is known, the resource allocation signal (UL Grant) may include only the information for specifying the second CC.

In step 22, as to a respective one of the plurality of ECs associated with the second CC, the UE 100 monitors whether or not interference of any other communication system such as Wi-Fi is observed (LBT: Listen Before Talk).

In step S23, the UE 100 selects the target EC used in uplink communication. In more detail, the UE 100 selects, as the target EC, the EC for which interference of any other communication system such as Wi-Fi has not been observed.

In step S24, the UE 100 transmits data (PUSCH) by using the target EC selected in step S23, In step S25, the eNB 200 receives the data (PUSCH). Here, it is to be noted that the eNB 200 monitors all of the plurality of ECs associated with the second CC.

Other Embodiments

Although the present invention was described by way of the foregoing embodiment, it is not to be understood that the statements and drawings forming a part of this disclosure limit the present invention. From this disclosure, a variety of substitute embodiments, examples, and operations and techniques would be self-evident to one skilled in the art.

As described in the embodiment, the plurality of ECs associated with the second CC may be included in a message (for example, RRC Connection Reconfiguration) to be individually transmitted to the UE 100. In such a case, the RRC Connection Reconfiguration, as illustrated in FIG. 17, may include information (EC-ToAddModList) to specify an EC to be added to the ECs associated with the second CC at the present stage. Alternatively, the RRC Connection Reconfiguration may include information (for example, EC-ToRemoveModList) to specify an EC to be deleted from the ECs associated with the second CC at the present stage. Alternatively, the RRC Connection Reconfiguration may include a list of ECs to be associated with the second CC after reception of the RRC Connection Reconfiguration.

Although not set forth in particular in the embodiment, the plurality of ECs associated with the second CC may be intra-band (continuous) carriers only. The plurality of ECs associated with the second CC may be activated by Activation of the second CC or may be deactivated by Deactivation of the second CC.

In the embodiment, the eNB 200 selects an EC based on a result of the LBT. However, the embodiment is not limited thereto. For example, the eNB 200 may select an EC based on at least one item of information of CSI feedback and Measurement Result received from the UE 100. In this manner, it is possible to increase the capacity during communication after the start of communication as well as initial access control at the time point of the start of communication exerted by transmission with the use of the adjacent Wi-Fi or the like.

Although not set forth in particular in the embodiment, a program which causes a computer to execute the processing operations to be performed by the UE 100 and the eNB 200 may be provided. In addition, the program may be recorded in a computer-readable medium. By using the computer-readable medium, it is possible to install the program in the computer. Here, the computer-readable medium in which the program has been recorded may be a non-transient recording medium. Although the non-transient recording medium is not limited in particular, for example, it may be a recording medium such as CD-ROM or DVD-ROM.

Alternatively, a memory to store the program for executing the processing operations to be performed by the UE 100 and the eNB 200 and a processor to execute the program stored in the memory may be provided.

In the embodiment, an LTE system was described as an example of a mobile communication system. However, the embodiment is not limited thereto. The mobile communication system may be a system other than the LTE system.

Although the embodiment was described on the presupposition that it is carried out by CA (Carrier Aggregation), it may be carried out by DC (Dual Connectivity), for example, without being limited thereto.

CROSS REFERENCE

The entire contents of Japanese Patent Application No. 2015-054049 (Mar. 17, 2015) are incorporated in the specification of the present application by reference.

INDUSTRIAL APPLICABILITY

The present invention is useful in the field of communication.

The invention claimed is:
1. A communication apparatus comprising:
a first processing unit configured to perform processing of a first layer; and
a second processing unit configured to perform processing of a second layer which is provided to be upper than the first layer, wherein the second processing unit is configured to perform communication by using a first component carrier included in a licensed band and perform communication by using a second component carrier included in an unlicensed band, and the first processing unit is configured to perform communication by using the first component carrier and performs communication by using an element carrier selected from among a plurality of element carriers associated with the second component carrier.

2. The communication apparatus according to claim 1, wherein a bandwidth of a respective one of the plurality of element carriers is same as a bandwidth of the first component carrier.

3. The communication apparatus according to claim 1, wherein the plurality of element carriers associated with the second component carrier are specified by a message of a third layer which is provided to be upper than the second layer.

4. The communication apparatus according to claim 1, further comprising a communication unit configured to notify a target element carrier which is the element carrier used in communication of data between the communication apparatus and a counterpart communication apparatus, to the counterpart communication apparatus, wherein the communication unit notifies the target element carrier by using the first component carrier.

5. The communication apparatus according to claim 4, wherein the communication unit notifies the target element carrier in a second subframe earlier than a first subframe which is a subframe used in communication of the data.

6. The communication apparatus according to claim 4, wherein the communication unit notifies the target element carrier in a subframe used in communication of the data, and the data is communicated by using a latter slot of two slots which constitute the subframe.

7. The communication apparatus according to claim 1, further comprising a resource allocation unit configured to transmit, in a target element carrier which is an element carrier used in communication of data from the communication apparatus to a counterpart communication apparatus, a resource allocation signal to specify a resource for transmitting the data from the communication apparatus, to the counterpart communication apparatus, wherein the resource allocation signal includes at least information for specifying the target element carrier.

8. The communication apparatus according to claim 1, further comprising a resource allocation unit to transmit, in a target element carrier which is an element carrier used in communication of data from a counterpart communication apparatus to the communication apparatus, a resource allocation signal to specify a resource for receiving the data from the counterpart communication apparatus, to the counterpart communication apparatus, wherein the resource allocation signal includes at least a candidate for an element carrier used as the target element carrier.

9. The communication apparatus according to claim 1, comprising a communication unit configured to notify a target element carrier which is an element carrier used in communication of the data between the communication apparatus and a counterpart communication apparatus, to the counterpart communication apparatus, wherein the communication unit transmits, in the subframe used in communication of the data, a resource allocation signal indicating a resource for communicating the data and the target element carrier, to the counterpart communication apparatus, a transmission timing of the resource allocation signal is earlier than a communication timing of the data, and a time interval between the transmission timing of the resource allocation signal and a communication timing of the data is longer than a time interval required to switch the target element carrier.

10. The communication apparatus according to claim 9, wherein the communication unit receives information indicating capability of the counterpart communication apparatus from the counterpart communication apparatus, and the time interval required to switch the target element carrier is determined based on the capability of the counterpart communication apparatus.

11. The communication apparatus according to claim 9, wherein the time interval required to switch the target element carrier is specified by a message of a third layer that is provided to be upper than the second layer.

12. The communication apparatus according to claim 1, comprising a communication unit configured to notify a target element carrier which is an element carrier used in communication of data between the communication apparatus and a counterpart communication apparatus, to the counterpart communication apparatus, wherein the communication unit transmits, in a subframe used in communication of the data, a resource allocation signal indicating a resource for communicating the data and the target element carrier, to the counterpart communication apparatus, the communication unit notifies the target element carrier by using the first component carrier, a frame timing of a subframe using the licensed band is earlier than a frame riming of a subframe using the unlicensed band, and an offset between the frame timing of the subframe using the licensed band and the frame timing of the subframe using the unlicensed band is longer than the time interval required to switch the target element carrier.

13. The communication apparatus according to claim 12, wherein the offset is specified by a message of a third layer which is provided to be upper than the second layer.

14. A communication method comprising:

a step A of performing processing of a first layer and;

a step B of performing processing of a second layer that is provided to be upper than the first layer, wherein the step B includes the step of performing communication by using a first component carrier included in a licensed band and performing communication by using a second component carrier included in an unlicensed band, and the step A includes the step of performing communication by using the first component carrier and performing communication by using an element carrier selected from among a plurality of element carriers associated with the second component carrier.

* * * * *